Figure 1:
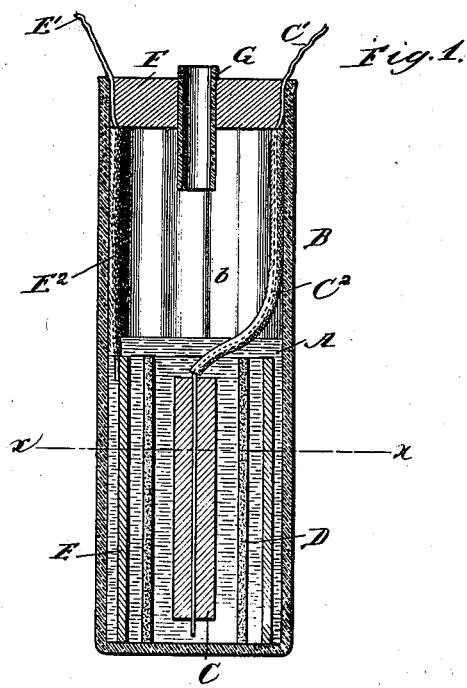

(No Model.)

F. H. ROOT.
GALVANIC BATTERY.

No. 393,123. Patented Nov. 20, 1888.

Witnesses
W. Rossiter
L. S. Logan

Inventor:
Francis H. Root
By Chas. G. Page
Atty.

UNITED STATES PATENT OFFICE.

FRANCIS H. ROOT, OF CHICAGO, ILLINOIS, ASSIGNOR TO THE ROOT ELECTRIC GAS LIGHTING COMPANY, OF ILLINOIS.

GALVANIC BATTERY.

SPECIFICATION forming part of Letters Patent No. 393,123, dated November 20, 1888.

Application filed November 2, 1887. Serial No. 254,072. (No model.)

*To all whom it may concern:*

Be it known that I, FRANCIS H. ROOT, a citizen of the United States, residing at Chicago, in the county of Cook and State of Illinois, have invented certain new and useful Improvements in Galvanic Batteries, of which the following is a specification.

In carrying out my invention I provide in a battery-cell a chloride-of-silver electrode and a zinc electrode, the former constituting the negative and the latter the positive element. These electrodes are immersed in an exciting medium consisting of a gelatine solution charged with muriate of ammonia and reduced to about the consistency of a thick paste. The use of gelatine as a vehicle for holding the muriate of ammonia in a battery containing a chloride-of-silver electrode involves the following several advantages, to wit: The presence of a chloride-of-silver electrode renders the battery so sensitive and liable to short circuiting that the use of chloride of silver in a small battery containing an exciting medium in a fluid condition is impracticable. The employment of the thickened exciting medium herein present serves to hold against the positive electrode the particles of oxide which form thereon, and likewise serves to hold against the negative electrode the particles of silver resulting from the change of chloride of silver to pure silver, which takes place during the working of the battery. The density of such thickened exciting medium opposes therefore a desirable resistance to any shifting about within the cell of particles from the electrodes, whereby particles from one electrode will be prevented from extending over to the other electrode, and in like manner particles from the two electrodes will be prevented from meeting. This feature also renders it practicable to employ a powerful excitant in an exceedingly small chloride-of-silver battery without danger of local action, and hence admits of the provision of a highly-efficient battery which is free from polarization and capable of producing a practically steady and uniform current throughout its entire life, and which can be brought within a compass so small as to render it capable of use in situations where the presence of a battery of ordinary size would be a matter of impossibility. The gelatine solution thus charged with muriate of ammonia will be free from fermentation, although I may, as an additional safeguard against fermentation, prepare the gelatine from sea-moss. As a further incident to the employment of the exciting medium thus thickened by gelatine to a pasty condition, evaporation as well as fermentation is avoided, the electrodes held apart and in determinate positions, and a battery provided which can be tipped over without loss of the excitant.

As a further and absolute safeguard against local action, I provide in connection with the zinc and chloride-of-silver electrodes immersed in a gelatine solution charged with muriate of ammonia, a porous cup or cylinder arranged intermediate of the two electrodes and likewise immersed or embedded in the thickened exciting medium, which serves to compactly fill up the spaces intervening between the porous cup and the electrodes. As a means for preventing the salts from creeping out from the cell, I close the cell with a porous stopper or cork saturated with oil and provided with a vent consisting of a glass or other analogous tube, which extends centrally through the oiled stopper and enters an air-space left between the immersed electrodes and the closed top of the cell. The salts will not creep along the oiled surface of the stopper, and by locating the vent at the center of the latter all possibility of the salts finding their way out of the cell will be avoided.

Other details of construction tending to the general efficiency of the battery will be hereinafter set forth.

Figure 2:
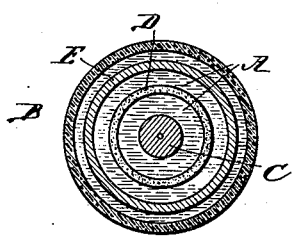
Figure 3:
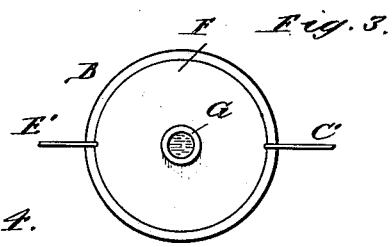
Figure 4:
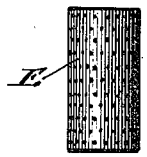

In the drawings, Figure 1 represents a vertical central section through a battery-cell embodying my invention. Fig. 2 is a transverse section through the battery-cell on the line *x x*, Fig. 1. Fig. 3 is a top plan view. Fig. 4 represents on a smaller scale the zinc electrode formed of a perforated zinc cylinder.

In said drawings, A denotes the exciting medium, understood to consist of muriate of ammonia or its equivalent thickened by gelatine to a pasty condition and in quantity to partially fill the battery-cell B. The block or stick C of chloride of silver, which forms the negative electrode, is suspended centrally within the cell and entirely immersed within the thickened exciting medium. The wire C' from the chloride-of-silver electrode is carried out through the closed top of the cell, and will in practice be a silver wire or silver-plated wire, which for the portion of its length between the chloride-of-silver electrode and the closed top of the cell should be enveloped by an insulating covering or coating, $C^2$. The chloride-of-silver electrode stands centrally within a porous cup, D, consisting of a cylindric shell, which is set within the cell and likewise immersed in the thickened exciting medium.

The chloride-of-silver electrode is immersed in the thickened exciting medium, and herein held from all contact with the porous cup by reason of the density of the mass. The porous cup stands within the zinc electrode E, which consists of a zinc cylinder, likewise set within the cell and immersed in the thickened exciting medium. The wire E' from the zinc electrode is, like the wire from the chloride-of-silver electrode, either a silver or silver-plated wire insulated along its length between the electrode and the closed top of the cell by some suitable insulating envelope or covering, $E^2$.

The zinc electrode is preferably perforated, as in Fig. 4, so as to provide vents for such bubbles of hydrogen gas as may form along the surface of the cylinder and tend to force the exciting medium away from the same. Where desirable, the thickened exciting medium shown filled into the space between the jar and the outer side of the zinc cylinder can be omitted, so that in case of an undue accumulation of such gas it can pass through the perforations of the zinc cylinder into a clear space between the latter and the jar, and thence up into the space $b$ above the immersed electrodes. The cell is closed at the top by a porous stopper or cork, F, understood to be saturated with oil. This feature of an oiled stopper in the foregoing or other suitable galvanic battery will prevent the salts from creeping along the same, and in order to avoid all possibility of their exit through the necessary air-vent the stopper is provided with a vent consisting of a short tube, G, arranged to pierce the stopper centrally and extend a short distance downwardly into the air-space $b$.

By way of further distinguishing my improvement it may be observed that it has heretofore been proposed to employ in a battery an exciting-fluid thickened to the consistency of jelly by gelatine, corn-starch, corn-meal, or like matter capable of fermentation supposed to assist the action of the exciting-fluid.

In my specification and claims, so far as relates to the use of gelatine, I desire to be understood as excluding the idea of fermentation, and as regards the positive and negative elements to further restrict myself to the combination, with the gelatine, of chloride of silver and zinc, or an equivalent for zinc, it being a matter of improvement in small galvanic cells to combine as elements zinc and chloride-of-silver electrodes and gelatine saturated with muriate of ammonia, or its equivalent, which combination, so far as I am aware, is novel, although "chloride-of-silver batteries," as they are called, are old and well-known matters.

What I claim as my invention is—

1. The combination, substantially as herein described, in a galvanic cell of zinc and chloride-of-silver electrodes, a porous cup intermediate of said electrodes, and an exciting medium thickened to the consistency of paste and forming within the cell a pasty mass wherein the electrodes and the porous cup are immersed, for the purpose set forth.

2. The combination, substantially herein described, in a galvanic cell, of zinc and chloride-of-silver electrodes, a porous cup intervening between the two electrodes, and an exciting medium consisting of a gelatine solution charged with muriate of ammonia and reduced to the consistency of paste, said electrodes and porous cup being all immersed in said thickened exciting medium, for the purpose described.

3. The combination, substantially as described, in a galvanic cell, of the centrally-arranged chloride-of-silver electrode, the cylindric zinc electrode, the porous cup intervening between said electrodes, and a thickened exciting medium wherein the electrodes are embedded, for the purpose described.

4. A galvanic cell provided with a stopper saturated with oil to provide the stopper with an oiled surface for preventing the salts from creeping along the same, as described.

5. A galvanic cell provided with and closed by a stopper saturated with oil to provide within the cell an exposure of oiled-stopper surface, and having a tubular vent extending centrally through the stopper and entering the interior of the cell, substantially as described.

6. In a battery-cell, a perforated cylindric zinc electrode combined with a thickened exciting medium, substantially as described.

FRANCIS H. ROOT.

Witnesses:
CHAS. G. PAGE,
L. S. LOGAN.